US011377040B2

(12) United States Patent
Salter et al.

(10) Patent No.: US 11,377,040 B2
(45) Date of Patent: Jul. 5, 2022

(54) ACCESSORIES SUPPORTED BY DOOR STRIKERS OF MOTOR VEHICLES

(71) Applicant: Ford Global Technologies, LLC, Dearborn, MI (US)

(72) Inventors: Stuart C. Salter, White Lake, MI (US); David Brian Glickman, Southfield, MI (US); Jeffrey Robert Seaman, Brownstown, MI (US); Annette Lynn Huebner, Highland, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 48 days.

(21) Appl. No.: 17/076,905

(22) Filed: Oct. 22, 2020

(65) Prior Publication Data

US 2022/0126758 A1    Apr. 28, 2022

(51) Int. Cl.
*B60R 9/02* (2006.01)
*E05B 85/04* (2014.01)
*B60J 5/04* (2006.01)

(52) U.S. Cl.
CPC .............. *B60R 9/02* (2013.01); *B60J 5/042* (2013.01); *E05B 85/04* (2013.01)

(58) Field of Classification Search
CPC ............ B60R 9/02; B60J 5/042; E05B 85/04
USPC ................. 296/1.07, 1.02, 57.1, 50
See application file for complete search history.

(56) References Cited

U.S. PATENT DOCUMENTS

| | | | | |
|---|---|---|---|---|
| 4,787,476 A | * | 11/1988 | Lee | E06C 1/381 182/163 |
| 5,005,599 A | * | 4/1991 | Cunningham | A61H 3/00 135/72 |
| 5,293,957 A | * | 3/1994 | Lunden, Jr. | E06C 7/143 248/210 |
| 5,730,066 A | * | 3/1998 | Auten | B60N 3/001 108/44 |
| 6,305,815 B1 | * | 10/2001 | Lin | B25G 1/085 362/120 |
| 6,340,189 B1 | * | 1/2002 | Pordy | B60N 3/026 16/110.1 |
| 6,799,353 B1 | | 10/2004 | Stewart | |
| 7,757,613 B2 | | 7/2010 | Fisher | |
| 7,798,073 B2 | | 9/2010 | Swailes et al. | |
| 8,246,098 B2 | * | 8/2012 | Cheung | B62D 33/0273 296/146.12 |
| 8,595,874 B1 | * | 12/2013 | Knapp | B25F 1/006 7/138 |
| 8,854,201 B1 | * | 10/2014 | Hertz | B60Q 1/305 340/468 |

(Continued)

FOREIGN PATENT DOCUMENTS

JP       2017036024 A    2/2017

*Primary Examiner* — Joseph D. Pape
*Assistant Examiner* — Veronica M Shull
(74) *Attorney, Agent, or Firm* — Vichit Chea; Carlson, Gaskey & Olds, P.C.

(57) ABSTRACT

This disclosure relates to accessories configured to be supported by door strikers of motor vehicles. In particular, the accessories may be mounted to a motor vehicle when a traditional, or factory, door is removed. Some example accessories are useable as a step when mounted to the vehicle, and are also useable as a tool (i.e., as a shovel, flashlight, bit driver, socket wrench, and/or hex wrench) when removed from the vehicle.

20 Claims, 13 Drawing Sheets

(56) References Cited

U.S. PATENT DOCUMENTS

| | | | | |
|---|---|---|---|---|
| 9,403,466 B1 * | 8/2016 | Deng | ................... | F21L 4/00 |
| 9,700,109 B2 * | 7/2017 | Gordin | ................... | A45B 1/04 |
| 9,737,120 B2 * | 8/2017 | Gordin | ................... | A61H 3/00 |
| 9,821,696 B1 * | 11/2017 | Logan, Jr. | ................... | E05B 83/36 |
| 10,155,479 B2 | 12/2018 | Lewis | | |
| 10,308,292 B1 * | 6/2019 | Shedden | ................... | B62D 33/0273 |
| 10,470,536 B1 * | 11/2019 | Lundaas | ................... | A45B 3/00 |

\* cited by examiner

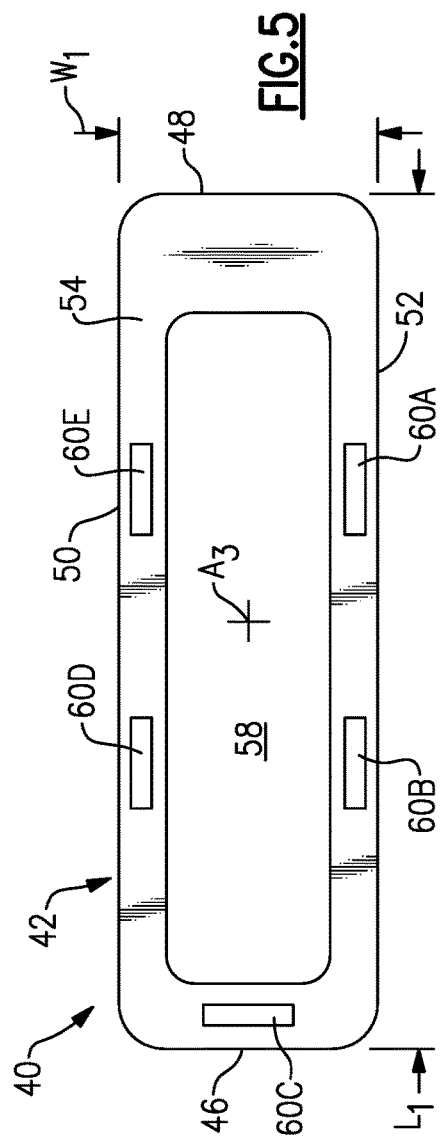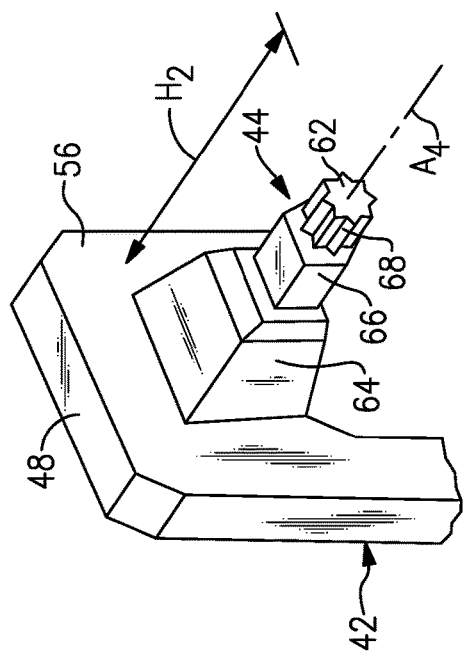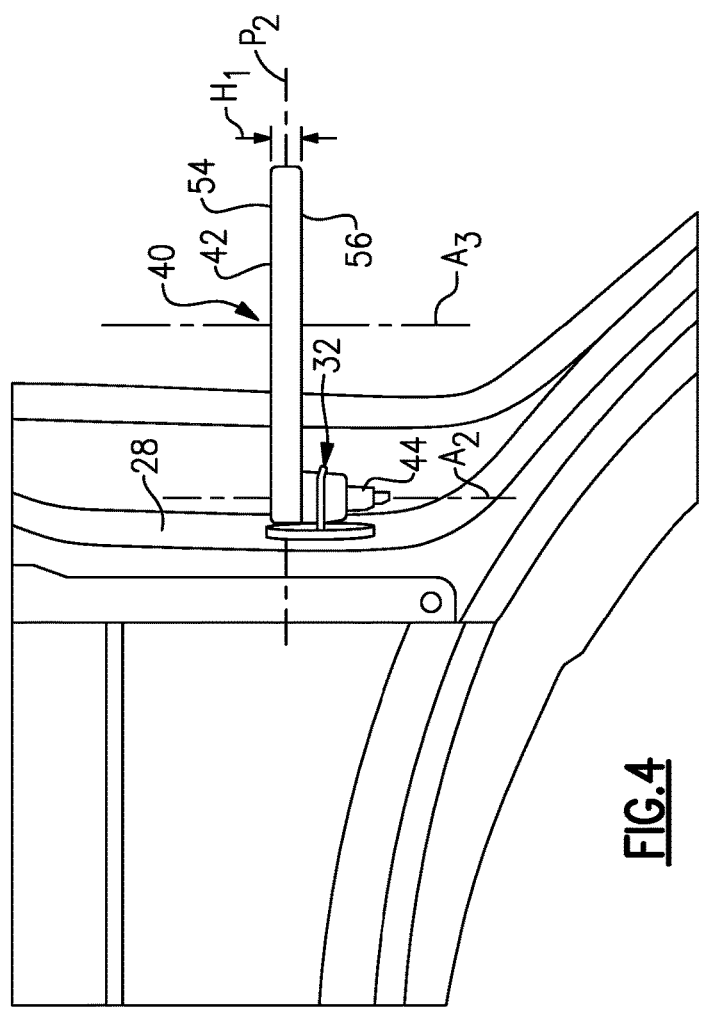

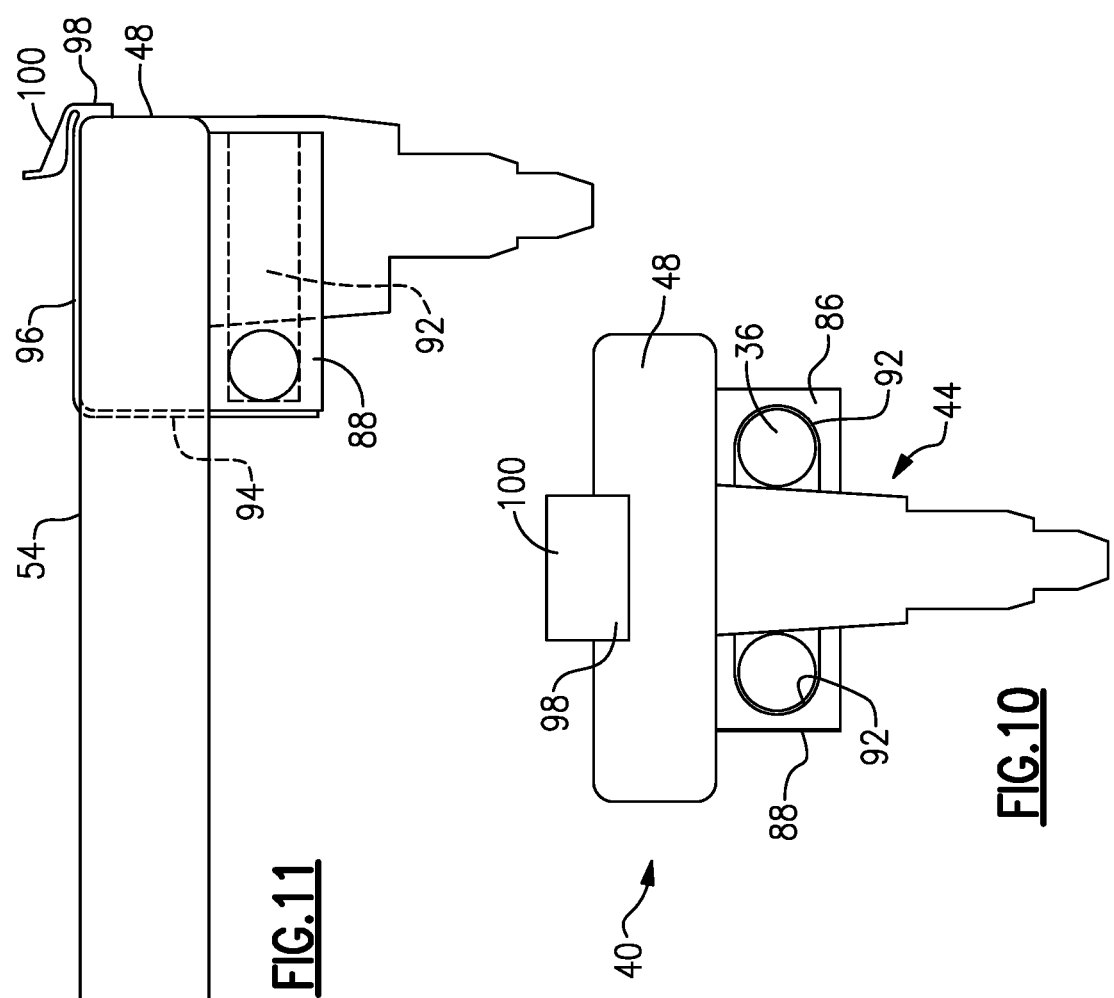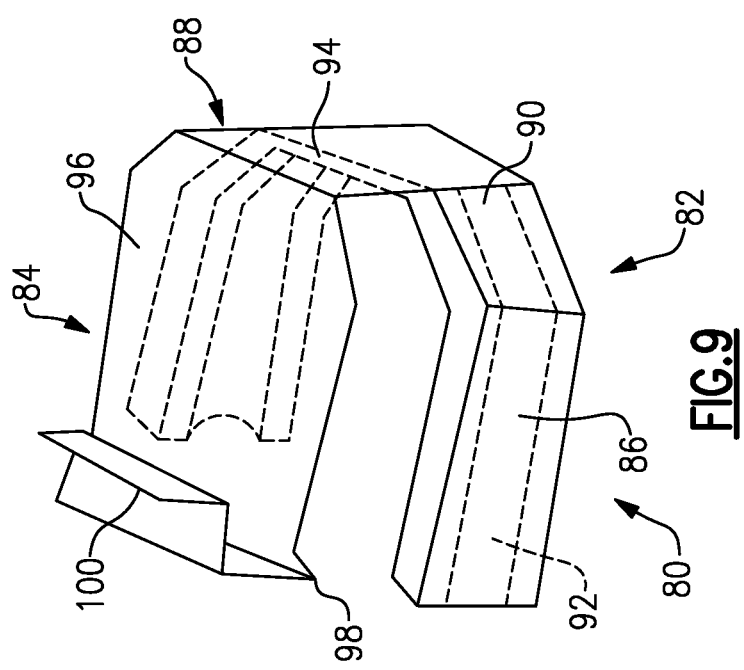

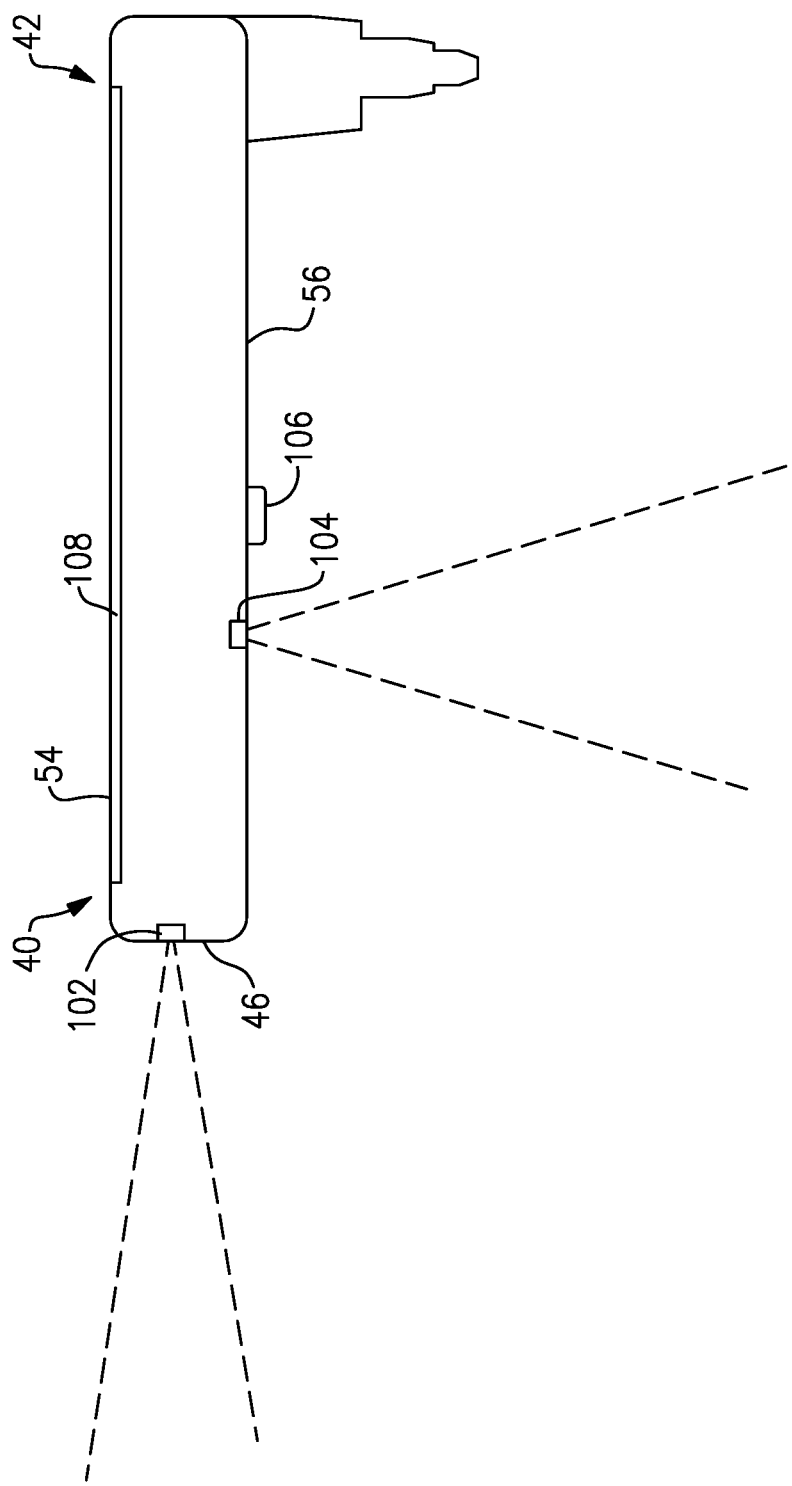

ACCESSORIES SUPPORTED BY DOOR STRIKERS OF MOTOR VEHICLES

TECHNICAL FIELD

This disclosure relates to accessories configured to be supported by door strikers of motor vehicles.

BACKGROUND

Some motor vehicles, such as sport utility vehicles (SUVs), are configured to be used when the traditional, factory doors are removed. Removing the traditional doors may provide users with increased access to the vehicle. Removing the traditional doors may also assist the driver with increased visibility of a ground surface adjacent the vehicle, which may be beneficial in certain situations, such as when driving the vehicle off road.

SUMMARY

An accessory for a motor vehicle according to an exemplary aspect of this disclosure includes, among other things, a first portion, and a second portion projecting from the first portion and configured to fit within a door striker of the motor vehicle. The accessory is configured such that, when the second portion is received in the door striker, the first portion provides a supporting surface, and, when the second portion is not received in the door striker, the accessory is useable as a tool.

In a further non-limiting embodiment of the foregoing accessory, the first portion provides a handle of the tool and the second portion is configured to mate with a fastener of the motor vehicle.

In a further non-limiting embodiment of any of the foregoing accessories, at least one light is incorporated into the first portion.

In a further non-limiting embodiment of any of the foregoing accessories, two lights are incorporated into the first portion.

In a further non-limiting embodiment of any of the foregoing accessories, the first portion includes a central opening having a greater area than a remainder of the first portion.

In a further non-limiting embodiment of any of the foregoing accessories, the first portion includes at least one slot adjacent the central opening and configured for attachment to a supplemental accessory.

In a further non-limiting embodiment of any of the foregoing accessories, the at least one slot includes a plurality of slots disposed about a perimeter of the central opening.

In a further non-limiting embodiment of any of the foregoing accessories, the supplemental accessory includes a multi-purpose device providing treads, a bottle opener, and a cup holder.

In a further non-limiting embodiment of any of the foregoing accessories, the supplemental accessory includes a storage container.

In a further non-limiting embodiment of any of the foregoing accessories, the supplemental accessory includes a ladder.

In a further non-limiting embodiment of any of the foregoing accessories, adjacent a bottom of the ladder, the ladder includes a platform configured to support an object.

In a further non-limiting embodiment of any of the foregoing accessories, the platform includes a serrated edge.

An accessory for a motor vehicle according to another exemplary aspect of the present disclosure includes, among other things, a first connector configured to be received in a first door striker of the motor vehicle, a second connector configured to be received in a second door striker of the motor vehicle, and a main portion extending between the first connector and the second connector. Further, when the first and second connectors are received in the respective first and second door strikers, the main portion provides a supporting surface.

In a further non-limiting embodiment of the foregoing accessory, an upper surface of the main portion is substantially flat.

In a further non-limiting embodiment of any of the foregoing accessories, the main portion is telescopic.

In a further non-limiting embodiment of any of the foregoing accessories, the main portion is foldable.

In a further non-limiting embodiment of any of the foregoing accessories, a height-adjustable leg projects from the main portion and is configured to contact a ground surface.

In a further non-limiting embodiment of any of the foregoing accessories, the main portion includes a control module configured to selectively activate a supplemental powered accessory.

In a further non-limiting embodiment of any of the foregoing accessories, the supplemental powered accessory includes lights.

In a further non-limiting embodiment of any of the foregoing accessories, the accessory is one of a table and a shovel.

BRIEF DESCRIPTION OF THE DRAWINGS

FIG. 4 is a view of a portion of the vehicle with an example accessory mounted to a door striker.

FIG. 5 is a top view of the example accessory of FIG. 4.

FIG. 6 is a bottom-perspective view of a portion of the accessory of FIG. 4.

FIG. 9 is a perspective view of a clip configured for use with the accessories of FIG. 4 or 7.

FIG. 10 is an end view illustrating the clip of FIG. 9 used relative to the accessory of FIG. 4.

FIG. 11 is side view illustrating the clip of FIG. 9 used relative to the accessory of FIG. 4.

FIG. 12 is another embodiment of the accessory of FIG. 4, including lights.

In FIG. 24, the table is in a folded position.

In FIG. 26, the table is in an expanded position. Also, in FIG. 26, lights are strung relative to the table and the vehicle.

DETAILED DESCRIPTION

This disclosure relates to accessories configured to be supported by door strikers of motor vehicles. In particular, the accessories may be mounted to a motor vehicle when a traditional, or factory, door is removed. Some example accessories are useable as a step when mounted to the vehicle, and are also useable as a tool (i.e., as a shovel, flashlight, bit driver, socket wrench, and/or hex wrench) when removed from the vehicle. This disclosure has a number of benefits which will be appreciated from the following description.

Figure 1:
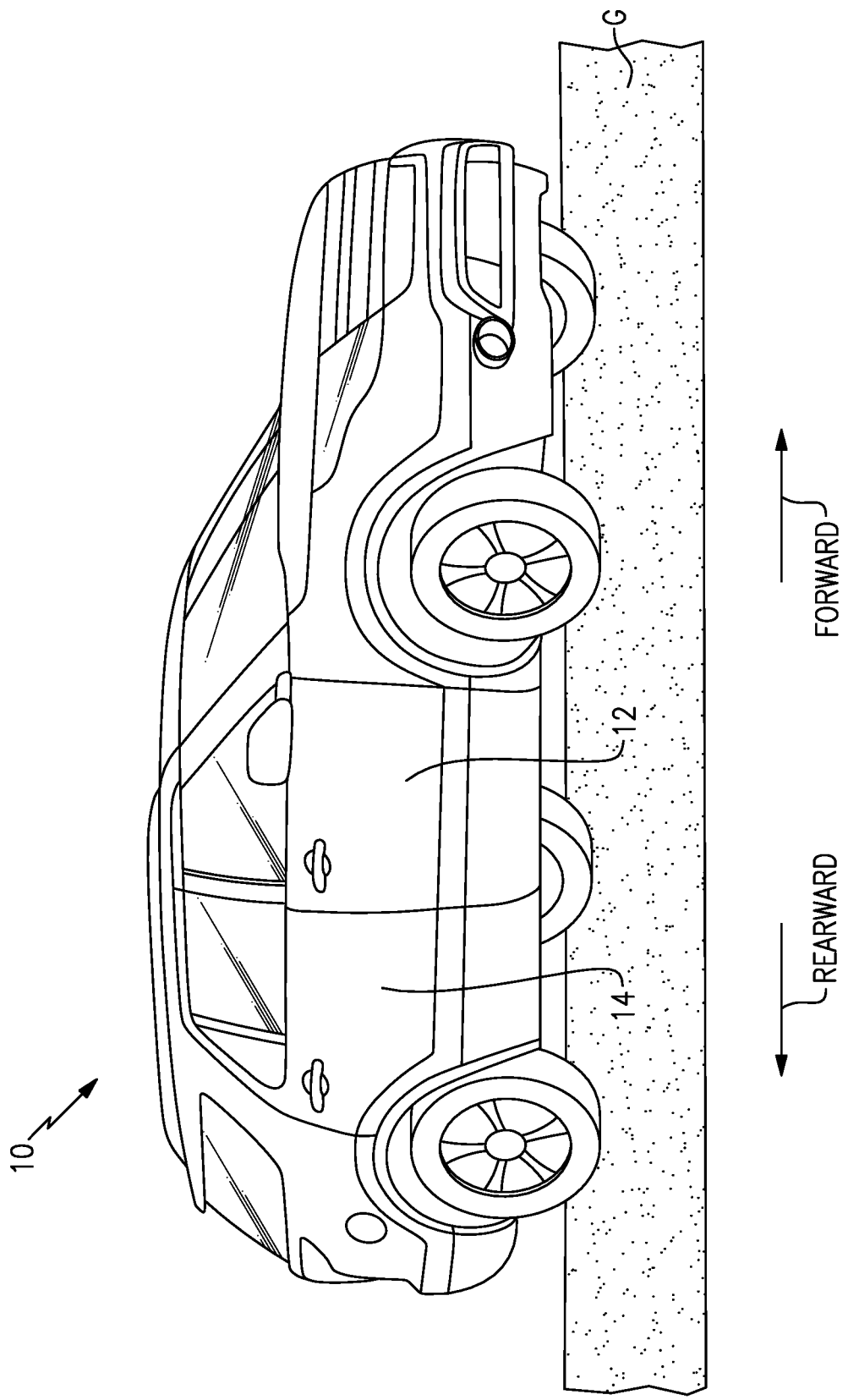
FIG. 1 is a front perspective view of an example motor vehicle.

Referring to the drawings, FIG. 1 is a front-perspective view of a first side, which in countries such as the United States is typically a passenger side, of a motor vehicle 10 ("vehicle 10"). As shown, the vehicle 10 is a sport utility vehicle (SUV). While an SUV is pictured, this disclosure is also applicable to other types of vehicles, such as cars, vans, and trucks (including pickup trucks). Further, the vehicle 10 could be an electrified vehicle, such as a battery electric vehicle (BEV) or a hybrid electric vehicle (HEV), or another type of vehicle such as a vehicle powered only by an internal combustion engine.

The vehicle 10 includes a first door 12 and a second door 14 rearward of the first door 12. The "forward" and "rearward" directions are labeled in FIG. 1 for ease of reference. When closed, the first and second doors 12, 14, together with a window, are configured to completely enclose a respective door opening. The first and second doors 12, 14 are referred to as traditional doors, herein. Traditional doors are those that are commonly sold standard with a vehicle by a manufacturer, and may be referred to as factory doors.

Figure 2:
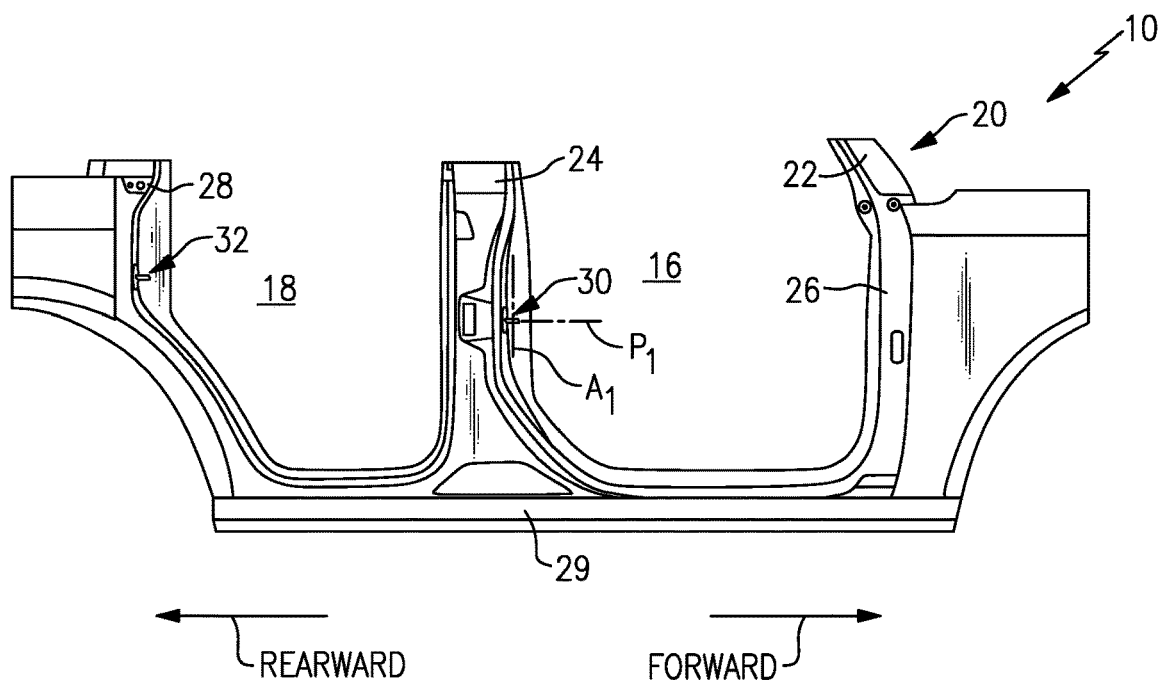
FIG. 2 is a side view of a portion of the vehicle.

The first and second doors 12, 14 are configured to selectively open and close to uncover and cover respective first and second door openings 16, 18 (FIG. 2) formed in the body 20 of the vehicle 10. Specifically, in this example, the first and second doors 12, 14 each include first and second attachment components configured to attach to corresponding first and second attachments components on the body 20 of the vehicle 10 to provide a hinge permitting the first and second doors 12, 14 to pivot relative to the first and second door openings 16, 18. While FIGS. 1 and 2 illustrate a first side of the vehicle 10 (e.g., the passenger side), it should be understood that the vehicle 10 is substantially symmetrical about its centerline, and that the opposite side (e.g., the driver side) of the vehicle 10 is arranged similarly, and in particular includes two door openings, each with a corresponding set of attachment components configured to provide hinges. Further, while in FIGS. 1 and 2 there are two doors 12, 14 and two corresponding door openings 16, 18, this disclosure extends to vehicles with one or more doors and door openings on each side of the vehicle.

With reference to FIG. 2, which illustrates a portion of the body 20 of the vehicle 10 without the doors 12, 14, the body 20 includes an A-pillar 22, a B-pillar 24, a hinge pillar 26 (which is sometimes referred to as an A-pillar tower reinforcement), a C-pillar 28, and a sill 29. The sill 29 extends parallel to the forward and rearward directions and provides a bottom of the door openings 16, 18. The A-pillar 22, B-pillar 24, hinge pillar 26, and C-pillar 28 project generally vertically upward from the sill 29.

The vehicle 10 may include removable side walls, and thus the A-pillar 22, B-pillar 24, and C-pillar 28 may be shorter than in vehicles with traditional, fixed side walls. To this end, the A-pillar 22 may only include the hinge pillar 26 in some examples. Regardless, this disclosure extends to vehicles having fixed side walls or removable side walls.

Moving counterclockwise relative to FIG. 2, the first door opening 16 is circumscribed by the A-pillar 22, hinge pillar 26, sill 29, and B-pillar 24. Further, the second door opening 18 is circumscribed by the B-pillar 24, the sill 29, and the C-pillar 28.

In this example, each of the B-pillar 24 and the C-pillar 28 includes a door striker 30, 32. When the doors 12, 14 are closed, a latch of the doors 12, 14 engages the door strikers 30, 32 to hold the doors 12, 14 in the closed position.

Figure 3:
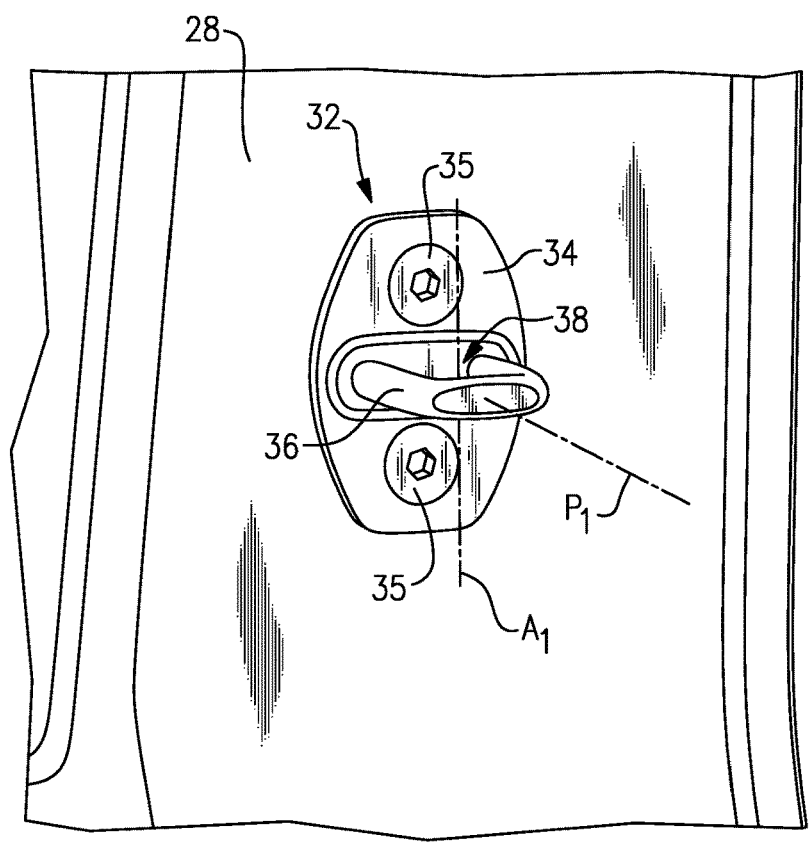
FIG. 3 is a close-up view of a door striker of the vehicle.

The door striker 32 is illustrated in more detail in FIG. 3. The door striker 30 is configured substantially similarly. The door striker 32 includes a striker plate 34 and a striker bar 36 projecting from the striker plate 34. The striker plate 34 is fastened to the C-pillar 28 using fasteners 35. The striker bar 36, here, is substantially U-shaped and is provided by a bent wire rod having ends that are connected to the striker plate 34. Other shapes for the striker bar 36 come within the scope of this disclosure. The striker bar 36 projects in the forward direction from the striker plate 34 and the C-pillar 28. Together with the striker plate 34, the striker bar 36 circumscribes an opening 38. The striker bar 36 lies in a plane $P_1$ (FIG. 2) substantially parallel to a ground surface G (FIG. 1) and the opening 38 is centered around an axis $A_1$ (FIG. 2) extending substantially perpendicular to the ground surface G. The ground surface G is substantially parallel to the forward and rearward directions. While a particular door striker 32 is shown in FIG. 3, this disclosure extends to other types of door strikers. Further, the door strikers 30, 32 may be referred to as door striker assemblies. Sometimes, door strikers 30, 32 are also generally referred to in the art as striker pins or striker plates.

This disclosure pertains to accessories configured to be supported by one or more of the door strikers of the vehicle 10, such as the door strikers 30, 32 and/or those on the opposite, driver side, of the vehicle 10. In this respect, the accessories may be attached to the door strikers when the doors 12, 14 of the vehicle 10 are removed. That said, the accessories may be used when the doors 12, 14 are attached to the vehicle 10, but in an open position, so that the door strikers are exposed. A user may choose to remove the doors 12, 14 based on personal preference. In particular, when the vehicle 10 is being used off-road, removing the doors 12, 14 can provide better access and visibility for the driver. Removing the doors 12, 14 typically includes removing a hinge pin or similar connector between the doors 12, 14 and the body 20. The user may also choose to remove the doors 12, 14 when camping or tailgating, as examples.

The accessories provide a number of different functions and benefits. Here, the term accessory is used to refer to a structure or collection of structures mountable to the vehicle 10 via the door strikers. The term accessory is not used herein as a replacement for the term "means." Various exemplary accessories will now be described.

A first example accessory 40 is illustrated in FIG. 4 relative to the door striker 32. The accessory 40 could be used relative to the door striker 30, or any other door striker of the vehicle 10, however. The accessory 40 includes a first portion 42 and a second portion 44 projecting from the first portion 42 and configured to fit within the door striker 32. In this example, the second portion 44 is positioned in the door striker 32 by being inserted into the opening 38 from a top direction. With the second portion 44 in the door striker 32, as in FIG. 4, the first portion 42 is provided in a plane $P_2$ substantially parallel to the ground surface G such that the first portion 42 provides a supporting surface, such as a step. In this regard, the first portion 42 is sized and configured to support a standard-sized shoe or boot. The accessory 40 increases the ease with which a user may access a roof of the vehicle 10, including any items which may be attached to the roof of the vehicle 10 and/or a roof rack of the vehicle 10.

The second portion 44 projects substantially perpendicularly from the first portion 42, along an axis $A_2$, which is perpendicular to the plane $P_2$. When the second portion 44 is received in the door striker 32, the axes $A_1$, $A_2$ are coextensive. In this example, when the second portion 44 is removed from the door striker 32, the accessory 40 is useable as a tool. In particular, in this example, the second portion 44 includes one of a bit, adapter, socket, etc., and is configured to mate with one or more fasteners of the vehicle 10, and the first portion 42 serves as a handle which a user may grasp and apply a rotational force to the fasteners of the vehicle 10 via the second portion 44.

The accessory 40 is particularly useful in vehicles with removeable body panels or removeable roof panels because the bit of the second portion 44 may be configured to fit with the fasteners of those removable panels. Thus, the accessory 40 is useable as a step and as a tool configured to remove and attach body panels of the vehicle 10. When not in use as a step or tool, the accessory 40 is sized so as to be readily stored in a glove box or other relatively small compartment of the vehicle 10. In this way, a user has relatively easy access to a tool configured to use relative to the body panels of the vehicle 10 and to a step.

FIG. 5 illustrates additional detail of the accessory 40, and namely illustrates additional detail of the first portion 42. The first portion 42 has a length $L_1$ between a first end 46 and a second end 48 opposite the first end 46, a width $W_1$ between a first side 50 and second side 52 opposite the first side 50, and a height $H_1$ (FIG. 4) between a top surface 54 and a bottom surface 56. The second portion 44 projects downward from the bottom surface 56 of the first portion 42 adjacent the second end 48.

The first portion 42 also exhibits a central opening 58 provided about a central axis $A_3$ extending in-and-out of the page, relative to FIG. 5. The first portion 42 circumscribes the central opening 58. The central opening 58 extends through the first portion 42 from the top surface 54 to the bottom surface 56. The central opening 58 is larger, by area, than the first portion 42. The central opening 58 reduces the overall weight of the accessory 40 and facilitates attachment of supplemental accessories to the accessory 40, as will be discussed below.

The first portion 42 further includes at least one slot extending through the first portion 42 from the top surface 52 to the bottom surface 56. The first portion 42, in this example, includes five slots 60A-60E. The slots 60A-60E are spaced-apart from one another relative to a perimeter of the central opening 58. Specifically, the slots 60A, 60B are positioned between the central opening 58 and the second side 52, the slot 60C is positioned between the central opening 58 and the first end 46, and the slots 60D, 60E are positioned between the central opening 58 and the first side 50. The slots 60A-60E are relatively narrow are exhibit a length dimension extending parallel to a perimeter of the central opening 58. The slots 60A-60E facilitate attachment of supplemental accessories to the accessory 40.

The second portion 44 is illustrated in more detail in FIG. 6. The second portion 44 projects along axis $A_4$ from the bottom surface 56 of the first portion 42 and extends along a height $H_2$ between the bottom surface 56 and a free end 62 of the second portion 44. Beginning at the bottom surface 56, the second portion 44 includes a tapered section 64 having a substantially rectangular cross-section that gradually reduces in size approaching the free end 62. A portion of the tapered section 64 closer to the free end 62 is sized and shaped so as to fit within the opening 38 of the door striker 32, while another portion of the tapered section 64 closer to the bottom surface 56 is of a greater size than the opening 38 and thus prevents further downward movement of the accessory 40 relative to the door striker 32. Thus, as a user applies a downward force onto the first portion 42, the tapered section 64 provides an interference fit with the door striker 32. The second portion 44 further includes a shoulder 66 projecting from the tapered section 64, and a bit 68 projecting from the shoulder 66. The shoulder 66 is configured to hold the bit 68, in some examples, in a removable manner. The bit 68, in this example, is a Torx bit. However, other bits come within the scope of this disclosure. The bit 68 is configured to mate with fasteners of the vehicle 10. The bit 68 may be changeable.

The first portion 42 may rigidly fixed to the second portion 44, or the first portion 42 and second portion 44 may be connected similar to a socket wrench, such that rotation of the first portion 42 about the axis $A_4$ in a first direction will not result in movement of the second portion 44, but rotation of the first portion 42 about the axis $A_4$ in a second direction opposite the first direction will result in a corresponding movement of the second portion 44. Further, the shoulder 66 could be configured to fit with some fasteners of the vehicle 10 without requiring removal of the bit 68. The shoulder 66 may be hexagonal in cross-section, in one example. In this way, the accessory 40 is configured to mate with different types of fasteners.

Figure 7:
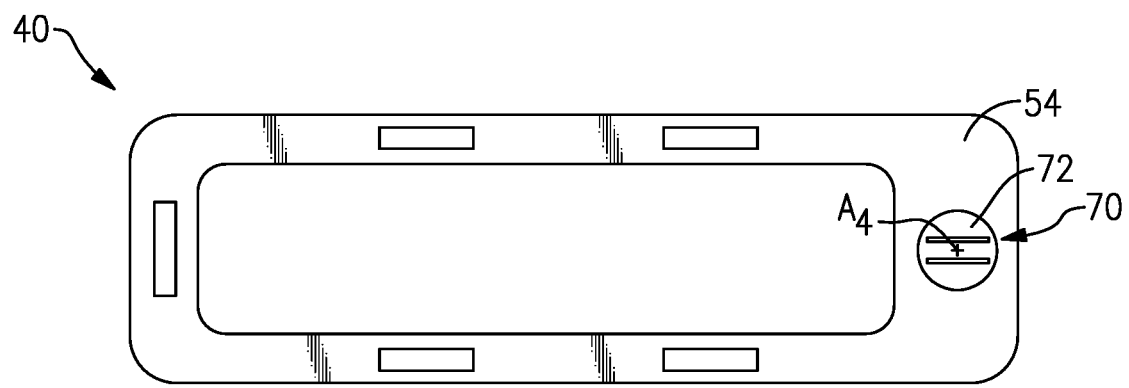
FIG. 7 is a top view of another embodiment of the accessory of FIG. 4.
Figure 8:
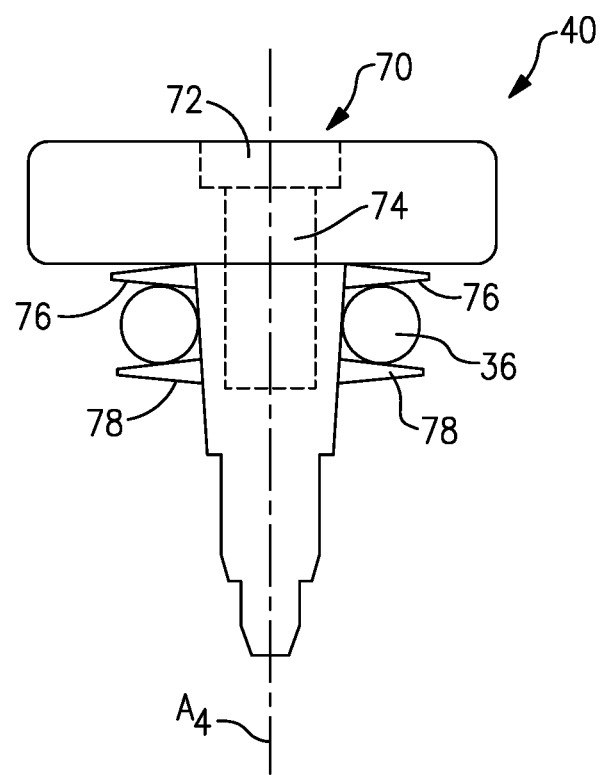
FIG. 8 is an end view of the accessory of FIG. 7.

The second portion 44 is configured to support loads, such as the weight of a user using the accessory 40 as a step, when received in the door striker 32. For added support, one or more locking mechanisms may be used to secure the accessory 40 to the door striker 32. FIGS. 7 and 8 illustrate a first example locking mechanism 70. The locking mechanism 70 includes a head 72 mounted substantially flush with the top surface 54. The head 72 is rotatable about the axis $A_4$. The head 72 is coupled to a shaft 74 extending within the tapered section 64. The shaft 74 is coupled to first and second sets of projections, or blades, 76, 78 which are configured to selectively project outward from the tapered section 64 in response to rotation of the head 72 and shaft 74. The first and second sets of projections 76, 78 are spaced-apart from one another along the axis $A_4$ by an amount substantially equal to a height of the striker bar 36 such that when the first and second sets of projections 76, 78 project from the tapered section 64, the striker bar 36 fits relatively snugly between the first and second sets of projections 76, 78. The first and second sets of projections 76, 78 thus restrict vertical movement of the accessory 40 relative to the striker bar 36. The tapered section 64 may be sized and shaped such that, in a first position, the first and second sets of projections 76, 78 are arranged within the tapered section 64. The tapered section may include a plurality of slots such that, upon rotation of the head 72 and shaft 74 by about 90° about the axis $A_4$, the first and second sets of projections 76, 78 project outward of the tapered section 64 into the position shown in FIG. 8.

Another example locking mechanism is shown between FIGS. 9-11. With joint reference to FIGS. 9-11, the example locking mechanism includes a clip 80 having a first section 82 configured to fit over the striker bar 36 and a second section 84 configured to fit relative to the accessory 40. The first section 82 includes a U-shaped body having first and second legs 86, 88 extending substantially parallel to one another and projecting from a third leg 90. The first section 82 further includes a groove 92 extending along each of the legs 86, 88, 90 and facing the open section of the U-shape (i.e., the left-hand direction in FIG. 9). The groove 92 is sized and shaped to receive the striker bar 36. The second section 84 includes a first leg 94 projecting from the third leg 90 by a height such that, when the groove 92 receives the striker bar 36, a second leg 96 projecting from the first leg 94 passes through the central opening 58 and engages the top surface 54 of the accessory 40. At a free end of the second leg 96, the second leg 96 includes a downwardly-projecting tooth 98 and an upwardly-projecting tab 100. A user can engage the tab 100 to selectively place the clip 80 relative to the door striker 32 and the accessory 40, and/or remove the clip 80 from the door striker 32 and accessory 40. When in place, the tooth 98 engages the second end 48 of the accessory 40 to resist detachment of the clip 80. The tooth 98 may be disengaged from the second end 48 by a user applying a force to the tab 100.

In an aspect of this disclosure, the accessory 40 may include one or more lights. In the example of FIG. 12, the accessory 40 includes a first light 102 and a second light 104. The first light 102 is mounted adjacent a first end 46 of the first portion 42 and is configured to emit light away from the accessory 40 in a direction perpendicular to a plane of the first end 46 (i.e., in the left-hand direction, relative to FIG. 12). The second light 104 is mounted adjacent a bottom surface 56 of the first portion 42 and is configured to emit light away from the accessory 40 in a direction perpendicular to a plane of the bottom surface 56 (i.e., in the downward direction, relative to FIG. 12). The first and second lights 102, 104 may be selectively activated (i.e., turned on) by a button 106. The button 106 may be pressed a number of times to cycle between one or more modes, in which one or both of the first and second lights 102, 104 are either activated or deactivated. The first and second lights 102, 104 may be battery powered, such as by a battery within the first portion 42. The first and second lights 102, 104 are activated in response to a capacitive sensor 108. The capacitive sensor 108 is adjacent a top surface 54 of the first portion 42 and is configured to generate a signal indicative of a user stepping on the accessory 40. In this regard, the first and second lights 102, 104 may be used to illuminate an area surrounding the accessory 40 when a user is using the accessory 40 as a step. The first and second lights 102, 104 may be powered off after a period of inactivity, such as 20 seconds. The first and second lights 102, 104 can be activated when the accessory 40 is attached to the door strikers 30, 32 or when the accessory is removed from the door strikers 30, 32. In this regard, the accessory 40, and in particular the first light 102, may be useable as a flashlight, which is considered a type of tool in this disclosure. When connected to the door strikers 30, 32, the accessory 40, and in particular the second light 104, may serve as a floodlight. The first light 102, second light 104, and capacitive sensor 108 may be overmolded with the accessory 40. In this regard, the accessory 40 may be made at least partially of a plastic material.

The accessory 40 may further include a transceiver, such as a Bluetooth low energy (BLE) tag, that is recognizable by the vehicle 10. If the accessory 40 is taken out of a range of the vehicle 10, such as outside of 600 feet from the vehicle 10, a signal may be pushed to the user. Further, the vehicle 10 may use triangulation to locate the accessory 40.

In another aspect, the accessory 40 may be overmolded or painted with long persistence phosphor which allows the accessory 40 to be seen if charged in daylight for 24-48 hours.

Figure 13:
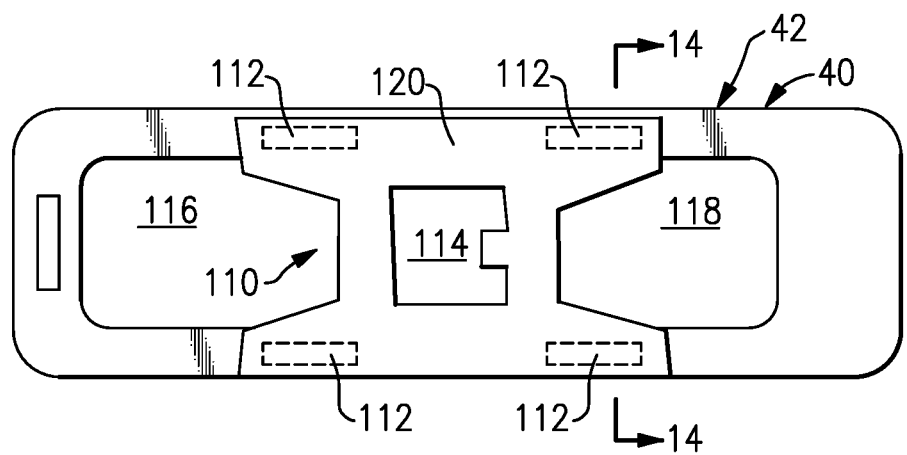
FIG. 13 is a top view of a first example supplemental accessory, which in this example is a multi-purpose device, mounted relative to the accessory of FIG. 4.
Figure 14:
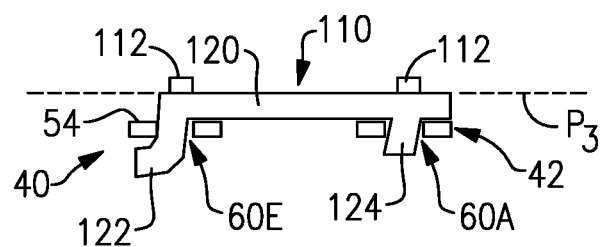
FIG. 14 is a cross-sectional view taken along line 14-14 from FIG. 13, and illustrates an exemplary manner in which the multi-purpose device mounts relative to the accessory.

As mentioned above, a number of supplemental accessories may be attached to the accessory 40. FIGS. 13 and 14 illustrate a first example supplemental accessory, which is a multi-purpose device 110 providing treads 112, a bottle opener 114, and cup holders 116, 118. In particular, the device 110 includes a main body 120 lying in a plane $P_3$. The main body 120 is attachable to the accessory 40 via the slots 60A-60E. In particular, in this example, the main body 120 includes first and second curved hooks 122 projecting downwardly therefrom and configured to engage with slots 60D, 60E. The main body 120 further includes first and second clips 124 projecting downwardly therefrom and configured to engage with slots 60A, 60B. To attach the device 110 to the accessory 40, the hooks 122 are first arranged in the slots 60D, 60E, and the device 110 is then rotated such that clips 124 engage the slots 60A, 60B. The clips 124 may expand once they pass through the slots 60A, 60B to hold the device 110 relative to the accessory 40. The clips 124 may include ends which are deflectable toward and away from one another in-and-out of the page, relative to FIG. 14. The device 110 may also be configured to hold a flag pole so that a user can fly a flag when driving the vehicle 10.

The main body 120 directly engages the top surface 54 when the device 110 is attached to the accessory 40 such that the planes $P_2$, $P_3$ are substantially parallel. The main body 120 includes a central cutout providing the bottle opener 114, and further includes side cutouts such that, together with the first portion 42, the main body 120 provides two cup holders 116, 118. Specifically, a user may place a standard-sized cup within the spaces labeled 116, 118 and the cup will not fall through the spaces but will instead by supported by the first portion 42 and the main body 120. Further, one or more treads 112 project upwardly from the main body 120. The treads 112 increase the traction between a boot or shoe of a user. The device 110 increases the utility of the accessory 40.

Figure 15:
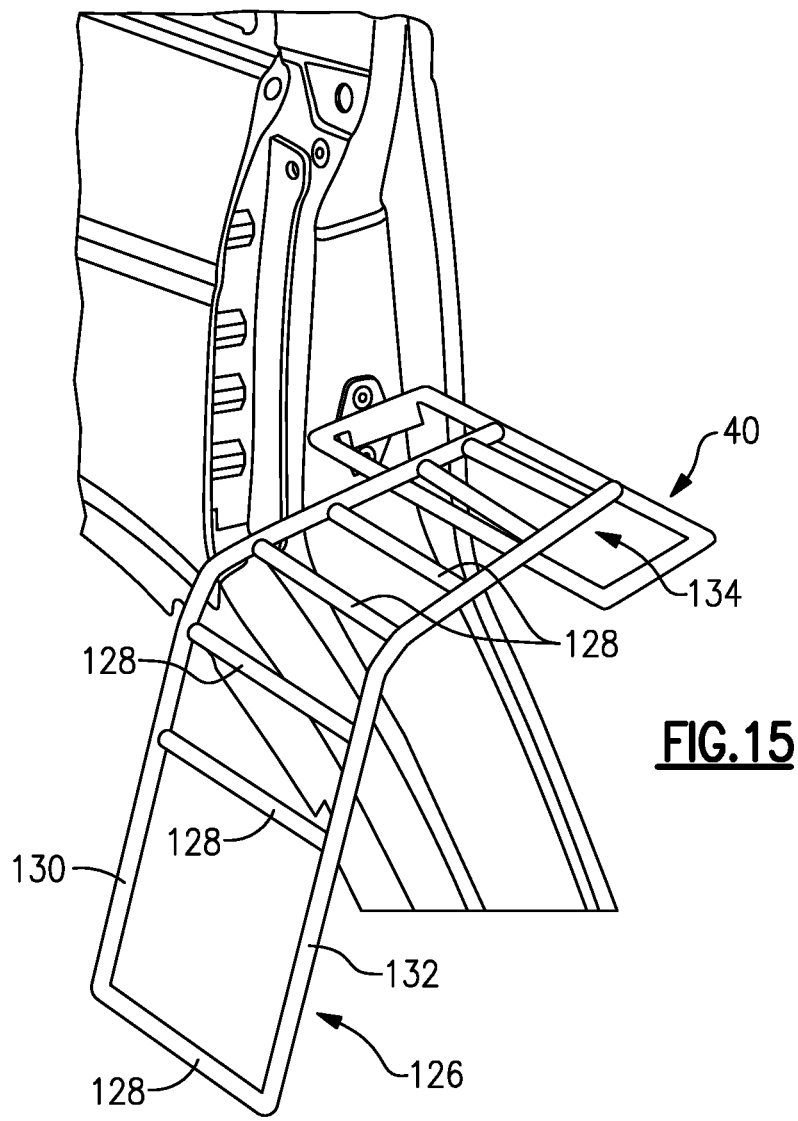
FIG. 15 is a perspective view of another example supplemental accessory, which in this example is a ladder, mounted relative to the accessory of FIG. 4.
Figure 16:
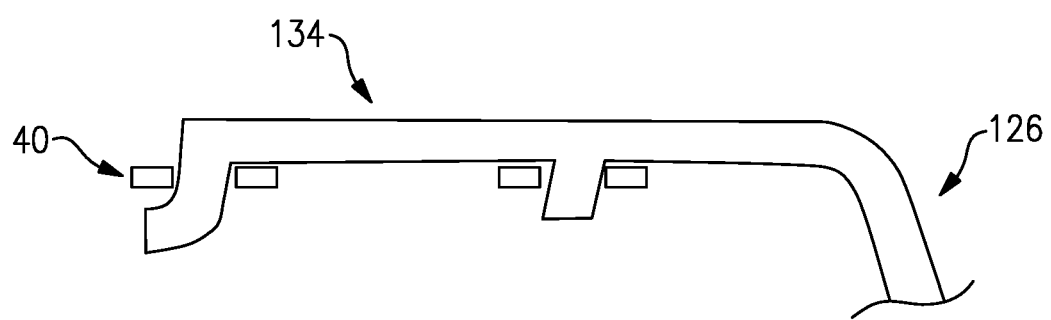
FIG. 16 is a view similar to FIG. 14, illustrating an exemplary manner in which the ladder attaches to the accessory.

Another example supplemental accessory is illustrated in FIGS. 15 and 16. In particular, FIGS. 15 and 16 illustrate an example in which the supplemental accessory is a ladder 126. The ladder 126 includes a series of steps provided by rungs 128. The rungs 128 are supported by opposed side rails 130, 132, which project outwardly, away from the vehicle 10, and downwardly from the accessory 40. The ladder 126 further includes an attachment section 134. The attachment section 134 is configured to attach to slots 60A, 60B, 60D, 60E in substantially the same manner as the device 110 of FIGS. 13, 14. The ladder 126 may attach to the accessory 40 in another manner. The ladder 126 increases the ease of humans or pets entering the vehicle 10. The ladder 126 further increases the ease of a human accessing the roof of the vehicle 10 via the accessory 40.

Figure 17:
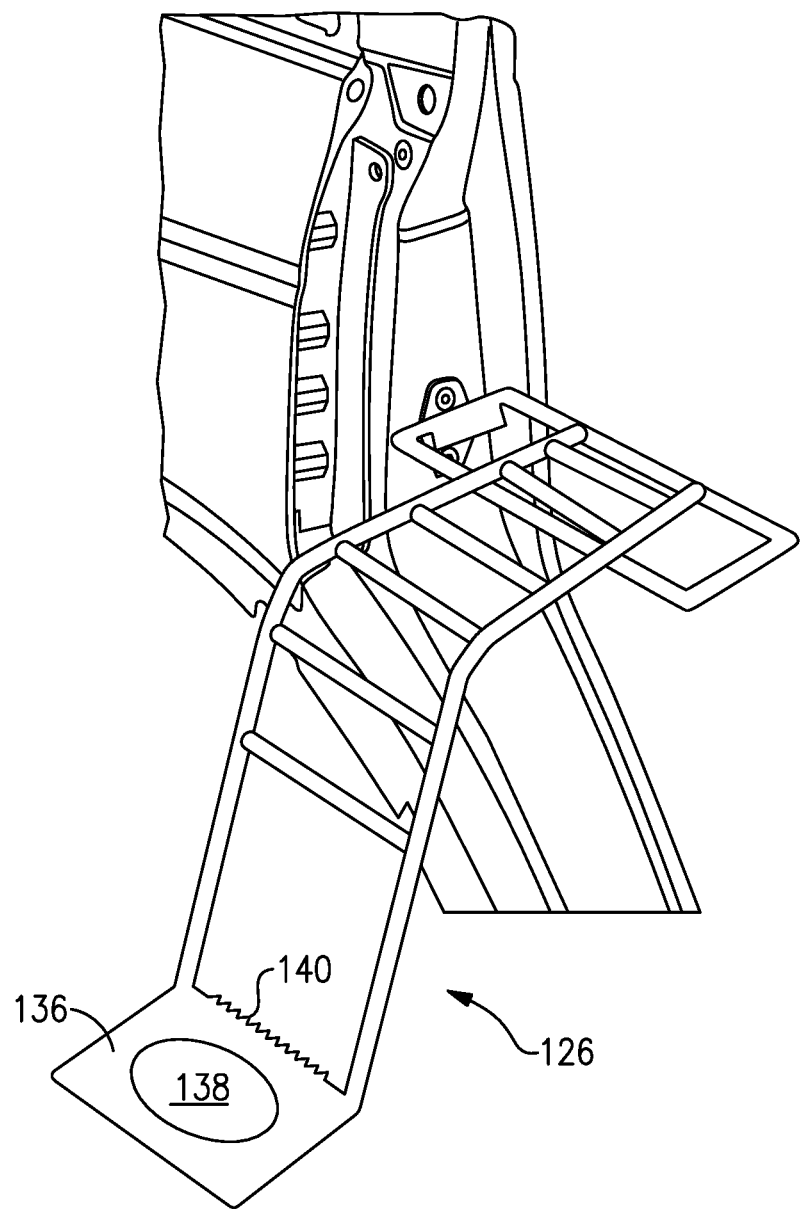
FIG. 17 is a perspective view of another example supplemental accessory, which in this example is a ladder with additional features, mounted relative to the accessory of FIG. 4.

A bottom-most rung 128 of the ladder 126 may include a shoe scraper. The ladder 126 may include additional functionality. In particular, FIG. 17 illustrates optional features for the ladder 126, including a platform 136 projecting from a bottom-most portion of the ladder 126. The platform 136, in this example, includes a central opening 138 sized and shaped to receive an object such as a dog bowl. Further, an edge of the platform 136 includes serrations 140, which may be used for de-scaling fish or as a shoe scraper, as examples. The ladder 126 could be configured as a ramp in some examples.

Figure 19:
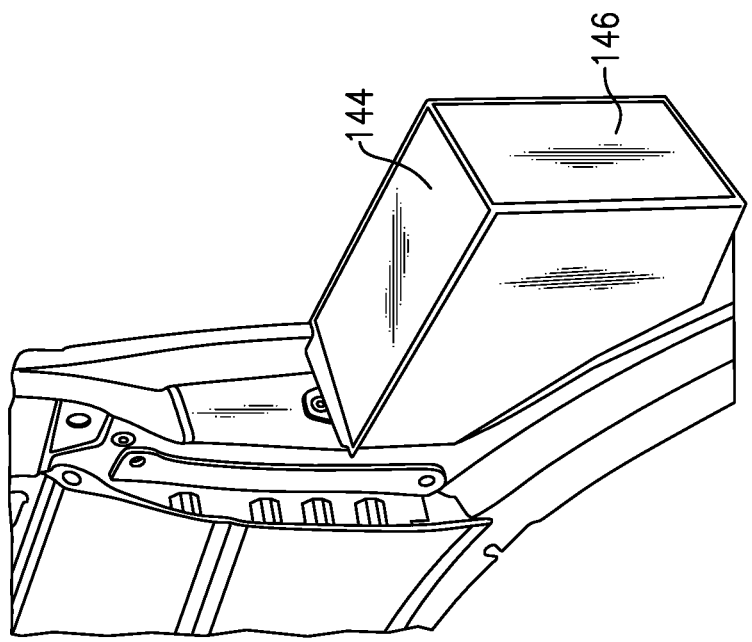
FIG. 19 is a perspective view of the storage bin of FIG. 18 mounted relative to the accessory.
Figure 18:
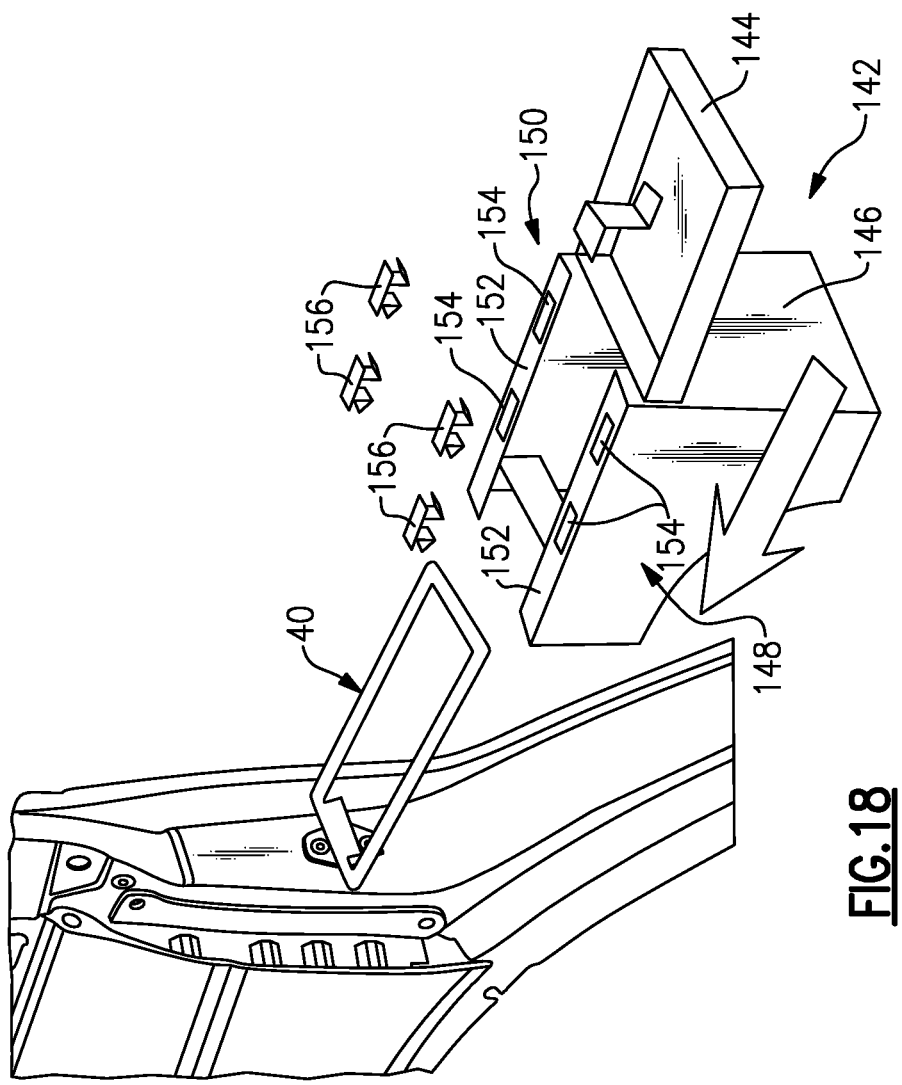
FIG. 18 is perspective view of another example supplemental accessory, which here is a storage bin, detached from the accessory of FIG. 4.
Figure 20:
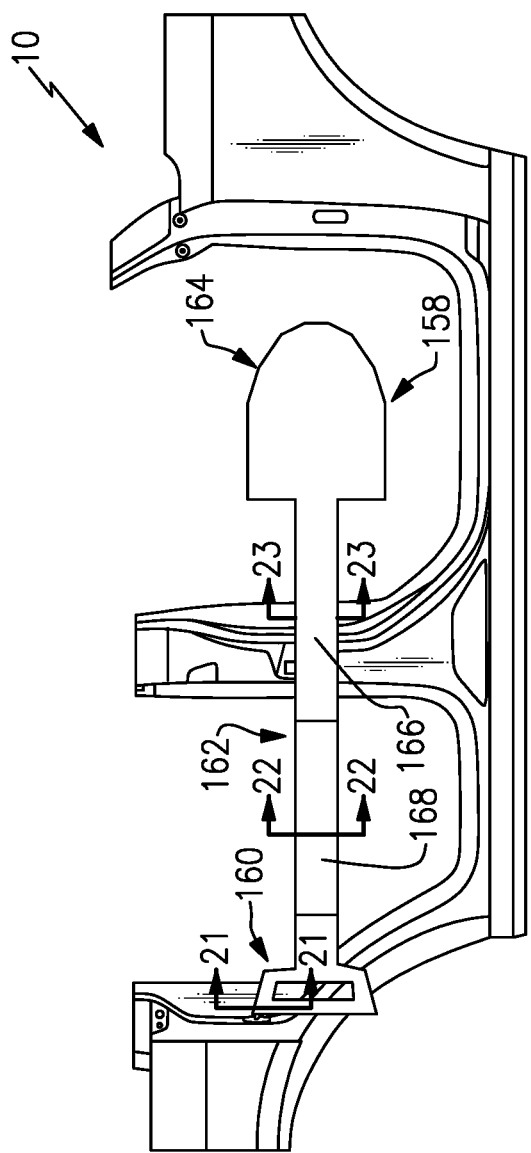
FIG. 20 is a side view of a portion of the vehicle and illustrates another accessory, which here is a shovel, mounted to the door strikers of the vehicle.

Another example supplemental accessory, namely a storage container 142, is illustrated in FIGS. 18 and 19. The storage container 142 includes a lid 144 lockable relative to a base 146. The base 146 is sized and shaped to extend below the accessory 40 and to fit relative to adjacent components of the body 20. The base 146 includes a container section 148 and an attachment section 150 projecting upwardly from the container section 148. The attachment section 150 includes opposed flanges 152, each including two slots 154 on a top surface thereof. The flanges 152 are configured such that the accessory 40, namely the first portion 42, fits between the flanges 152 and the container section 148 when the base 146 is slid in the rearward direction relative to the accessory 40. The slots 154 are configured to align with slots 60A, 60B, 60D, 60E. When aligned, clips 156 are inserted through the aligned slots 60A, 60B, 60D, 60E, 154 to attach the base 146 to the accessory 40. The clips 156 include opposed legs deflectable toward and away from one another. Once attached, the lid 144 can be selectively closed, as in FIG. 19, by sliding or by a hinged connection. The lid 144 may be lockable in some examples, either using a tumbler lock, numeric lock, etc. Further, the base 146 could include a speaker, such as a Bluetooth speaker. In this regard, the base 146 could also include a battery configured to power the speaker, or the base 146 could power the speaker via an electrical connection to a battery of the vehicle 10.

Figure 23:
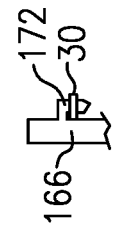
FIG. 23 is a cross-sectional view taken along line 23-23 from FIG. 20, and illustrates an example interface between the shaft of the shovel and a door striker.
Figure 22:
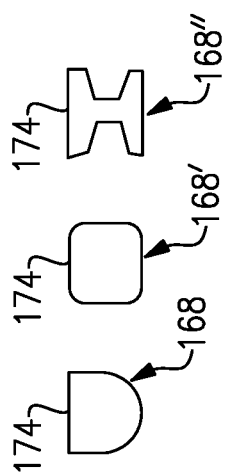
FIG. 22 is a cross-sectional view taken along line 22-22 from FIG. 20, and illustrates exemplary arrangements of a shaft of the shovel.
Figure 21:
FIG. 21 is a cross-sectional view taken along line 21-21 from FIG. 20, and illustrates an example interface between a handle of the shovel and a door striker.

FIGS. 20-23 illustrate another example accessory 158 according to this disclosure. As with the accessory 40, the accessory 158 is useable as a step when mounted to the vehicle 10 and is useable as a tool, namely a shovel, when removed from the vehicle 10. The accessory 158, in this example, is a shovel and includes a handle 160, a shaft 162, and a blade 164. The shaft 162 includes first and second sections 166, 168, which are configured to telescope relative to one another such that an overall length of the accessory 158 is adjustable, making the accessory 158 useable as a shovel by users of different heights and making the accessory 158 able to fit relative to differently-sized vehicles. The accessory 158 is attached to both door strikers 30, 32, in this example. For instance, relative to the handle 160, the handle 160 includes a hook 170 configured to fit within the door striker 32. Further, the shaft 162, namely the first section 166, includes a hook 172 configured to fit within the door striker 30. The hooks 170, 172 can be configured substantially similar to the second portion 44, or at least substantially similar to the tapered section 64 of the second portion 44. When the accessory 158 is mounted relative to the door strikers 30, 32, an upper surface 174 of the shaft 162, namely the second section 168, is flat so as to provide a supportive surface, such as a step. FIG. 23 illustrates three exemplary cross-sectional configurations for the section 168 (labeled as 168, 168', 168"), each of which includes a flat upper surface 174.

Figure 24:
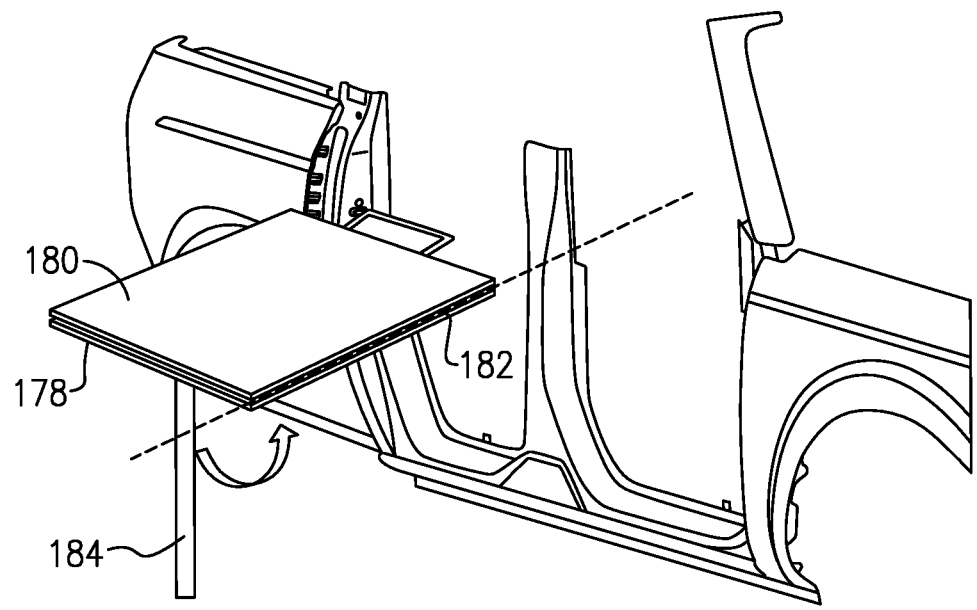
FIG. 24 illustrates another example accessory, which here is a table, relative to the vehicle.
Figure 25:
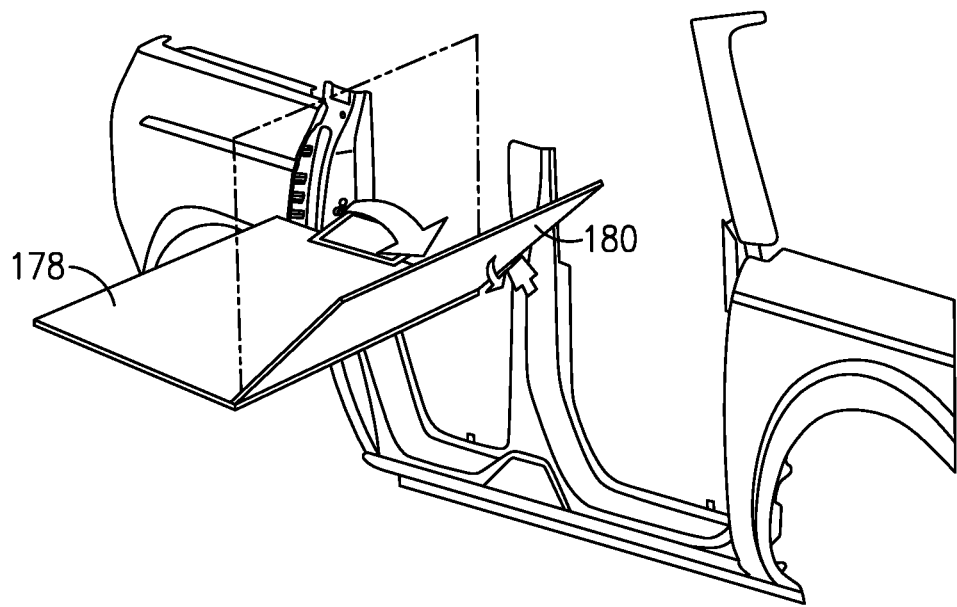
FIG. 25 illustrates the table of FIG. 24 moving from a folded position to an expanded position.
Figure 26:
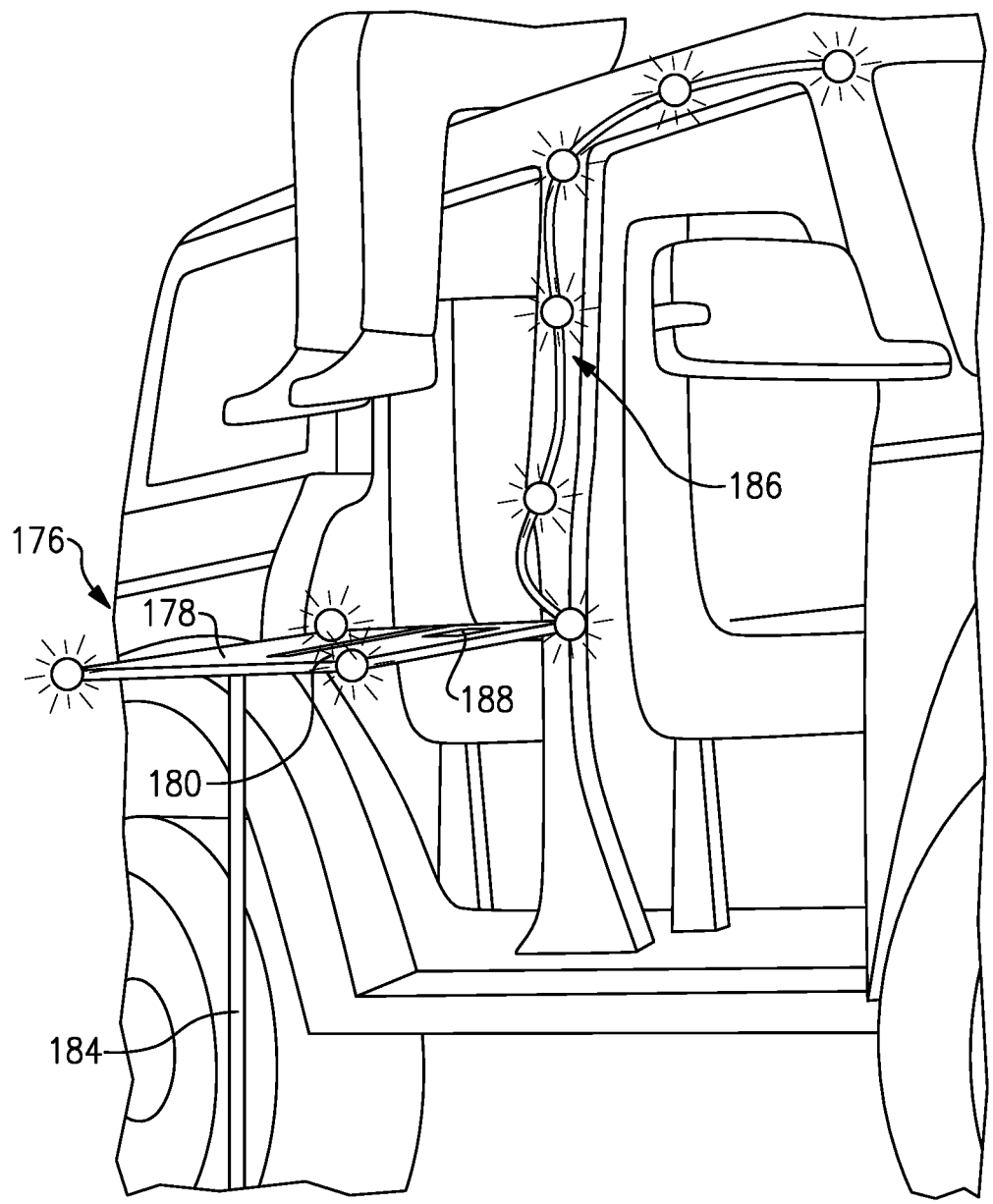
FIG. 26 illustrates the table of FIG. 24 relative to the vehicle.

Yet another type of accessory, which is a table 176, is illustrated relative to FIGS. 24-26. The table 176 includes first and second sections 178, 180 which are foldable relative to a hinged connection 182 to provide a table top when either folded or expanded. The table 176 further includes a height-adjustable leg 184 projecting downward from the first section 178 to support the table 176 relative to the ground surface G. The leg 184 is foldable relative to the first section 178 and is configured to contact the ground surface G when in use. In FIG. 24, the table 176 is useable in the folded position, with the second section 180 providing a top of the table 176. The table 176 is useable as a table and/or a step providing access to the roof of the vehicle 10.

The table 176 is also useable with the second section 180 rotated to provide the top of the table 176 with an increased surface area. Namely, the second section 180 may be rotated relative to the first section 178, as in FIG. 25, and each of the first and second sections 178, 180 provides a top of the table 176, as in FIG. 26. The first and second sections 178, 180 each include a hook configured for attachment to a respective one of the door strikers 30, 32, in this example. The hooks may be configured similar to the second portion 44, and in particular substantially similar to the tapered section 64. The table 176 may include one or more flaps configured to fold relative to the remainder of the table 176 to facilitate attachment of the hooks relative to the door strikers 30, 32. The table 176 is useable as a table for camping and/or tailgating, as examples, and is further useable as a step.

In FIG. 25, a powered accessory 186 is used relative to the table 176. In particular, the powered accessory 186 is a series of lights, commonly referred to as string or rope lights. The lights may be hung relative to poles, trees, the vehicle 10 itself, and/or the table 176. The powered accessory 186 may be controlled by a control unit 188 incorporated into the table 176 or separate from the table 176. The control unit 188 is operable by a user to selectively activate and deactivate the powered accessory 186. The powered accessory 186 may receive power from a battery of the table 176 or a battery of the vehicle 10, and the control unit 186 may be configured to deactivate the powered accessory when a state of charge of the battery falls below a lower threshold. The control unit 188 can selectively switch back and forth between batteries of the table 176 and the vehicle 10, as needed, in some examples. The battery of the table 176 can be charged by the battery of the vehicle 10 in certain conditions. The table 176 can connect to the battery of the vehicle 10 via the electrical connections adjacent the door openings, sometimes referred to as door harnesses. The control unit 188 can also instruct the vehicle 10 to start when a state of charge of the battery of the vehicle 10 falls below the lower threshold. The control unit 188 may include an interface providing a series of buttons, knobs, and/or switches. The control unit 188 may also include electrical outlets and charging ports, such as USB ports, so that users may charge their mobile devices via the table 176. Further, the control unit 188 may use the sensors of the vehicle 10 to determine a time of day and to automatically turn on the lights when it is determined to be night time. The control unit 188 may also deactivate the lights when it is determined to be day time.

While various accessories have been described above, other accessories and supplemental accessories come within the scope of this disclosure. For instance, another example accessory includes a fluid storage container, such as a water tank. The water tank, for example, could be configured to be mounted relative to one or both of the door strikers 30, 32, either directly or via one of the aforementioned accessories.

Directional terms such as "vertical," "upward," "downward," "forward," "rearward," "horizontal," "top," "bottom," etc., are used herein for purposes of explanation and with reference to the orientation of components illustrated in the drawings. Such directional terms should not be considered limiting. Further, it should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An accessory for a motor vehicle, comprising:
a first portion;
a second portion projecting from the first portion and configured to fit within a door striker of the motor vehicle; and
wherein the accessory is configured such that, when the second portion is received in the door striker, the first portion provides a supporting surface useable by a user as a step, and, when the second portion is not received in the door striker, the accessory is useable as a tool, wherein the second portion includes a bit, adapter, or socket configured to mate with a fastener of the motor vehicle and the first portion provides a handle of the tool such that the user is able to grasp the first portion and apply a rotational force to the fastener using the accessory.

2. The accessory as recited in claim 1, wherein at least one light is incorporated into the first portion.

3. The accessory as recited in claim 1, wherein the first portion includes a central opening having a greater area than a remainder of the first portion.

4. The accessory as recited in claim 3, wherein the first portion includes at least one slot adjacent the central opening and configured for attachment to a supplemental accessory.

5. The accessory as recited in claim 4, wherein the at least one slot includes a plurality of slots disposed about a perimeter of the central opening.

6. The accessory as recited in claim 4, wherein the supplemental accessory includes a multi-purpose device providing treads, a bottle opener, and a cup holder.

7. The accessory as recited in claim 4, wherein the supplemental accessory includes a storage container.

8. The accessory as recited in claim 4, wherein the supplemental accessory includes a ladder.

9. The accessory as recited in claim 8, wherein, adjacent a bottom of the ladder, the ladder includes a platform configured to support an object.

10. The accessory as recited in claim 9, wherein the platform includes a serrated edge.

11. An accessory for a motor vehicle, comprising:
a first connector configured to be received in a first door striker of a first side door of the motor vehicle;
a second connector configured to be received in a second door striker of a second side door of the motor vehicle; and
a main portion extending between the first connector and the second connector, wherein, when the first and second connectors are received in the respective first and second door strikers, the main portion provides a supporting surface.

12. The accessory as recited in claim 11, wherein an upper surface of the main portion is substantially flat.

13. The accessory as recited in claim 11, wherein the main portion is telescopic.

14. The accessory as recited in claim 11, wherein the main portion is foldable.

15. The accessory as recited in claim 14, wherein a height-adjustable leg projects from the main portion and is configured to contact a ground surface.

16. The accessory as recited in claim 11, wherein the main portion includes a control module configured to selectively activate a supplemental powered accessory.

17. The accessory as recited in claim 16, wherein the supplemental powered accessory includes lights.

18. The accessory as recited in claim 11, wherein the accessory is one of a table and a shovel.

19. The accessory as recited in claim 1, wherein the second portion is attached to the first portion such that:
the second portion projects from the first portion along an axis,
rotation of the first portion about the axis in a first direction does not result in movement of the second portion, and
rotation of the first portion about the axis in a second direction opposite the first direction does result in movement of the second portion.

20. The accessory as recited in claim 1, wherein:
the second portion includes a tapered section having a cross-section gradually reducing in size,
the tapered section exhibits a largest cross-section adjacent the first portion and a smallest cross-section at a furthest location from the first portion,
the tapered section provides an interference fit with the door striker, and
the bit, adapter, or socket is arranged on an opposite side of the tapered section as the first portion.

* * * * *